(12) United States Patent
Chang

(10) Patent No.: US 6,810,412 B1
(45) Date of Patent: Oct. 26, 2004

(54) METHOD FOR INCREASING NETWORK BANDWIDTH ACROSS MULTIPLE NETWORK INTERFACES WITH SINGLE INTERNET PROTOCOL ADDRESS

(75) Inventor: Chieh-Chung Chang, Plainsboro, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/538,311

(22) Filed: Mar. 30, 2000

(51) Int. Cl.[7] .............................................. G06F 15/16
(52) U.S. Cl. ........................ 709/203; 709/203; 709/217; 707/10; 707/103
(58) Field of Search ............................... 709/203, 217; 707/10, 103

(56) References Cited

U.S. PATENT DOCUMENTS

| | | | |
|---|---|---|---|
| 5,633,810 A | 5/1997 | Mandal et al. | |
| 5,761,416 A | 6/1998 | Mandal et al. | |
| 6,085,223 A | * 7/2000 | Carino | 709/203 |
| 6,324,492 B1 | * 11/2001 | Rowe | 703/13 |
| 6,473,803 B1 | * 10/2002 | Stern et al. | 709/238 |
| 2001/0047393 A1 | * 11/2001 | Arner | 709/216 |

OTHER PUBLICATIONS

Request For Comment Document No. 1597, Rekhter et al., pp 1–8, Mar., 1994.
Beowulf Project at CESDIS web cite (http://beowulf.gsfc.nasa.gov), author unknown, various pages, date unknown, attached pages printed on Mar. 29, 2000.

* cited by examiner

Primary Examiner—Rupal Dharia
Assistant Examiner—Adnan Mirza
(74) Attorney, Agent, or Firm—Harness, Dickey & Pierce, PLC

(57) ABSTRACT

A communication network having a server which communicates with a switch using a high bandwidth connection. The switch also communicates with one or a plurality of servers at a low bandwidth connection. The client connects to the switch using multiple bandwidth connections. Applications running on the client and server address the client having multiple low bandwidth connections utilizing a virtual internet protocol (IP) address. Devices which communicate using the virtual IP address include a virtual network driver (VND). The VND determines whether the application desires to read or write to a virtual IP address. If so, the VND distributes the data for transmission amongst the multiple bandwidth connections. Similarly, when a network devices receives data written to a virtual IP address, the VND assembles the data for utilization by the application so that the application appears to have received data from a single IP address.

10 Claims, 4 Drawing Sheets

US 6,810,412 B1

METHOD FOR INCREASING NETWORK BANDWIDTH ACROSS MULTIPLE NETWORK INTERFACES WITH SINGLE INTERNET PROTOCOL ADDRESS

BACKGROUND

The present invention relates generally to increasing the bandwidth of a communications network and, more particularly, to increasing the bandwidth of a communications network using multiple physical connections having a single virtual address.

Present network architectures support various bandwidths. Because the demand for high bandwidth network architectures continually increases, new technologies continually respond to this demand. In some network implementations, a significant performance gap exists between more recent and somewhat dated technologies. This performance gap often results in substantial bandwidth differences. Some network applications require a greater bandwidth than older, existing network interfaces provide, but significantly less bandwidth than that provided by newer, high speed network interfaces.

For example, a network implementing an Internet Protocol (IP) may utilize an ethernet physical implementation to support the IP. At slower speeds, a regular ethernet architecture operates at approximately 10 Megabytes per second (Mbps). At the next substantial speed increase, a fast ethernet architecture operates at 100 Mbps. At the next substantial speed increase, a giga ethernet supports 1,000 Mbps or 1 Gigabytes per second.

Many video applications require more than the 100 Mbps bandwidth provided by fast ethernet and substantially less than the 1000 Mbps bandwidth provided by giga ethernet. Specifically, many video applications require a bandwidth of approximately 150 to 200 Mbps. Thus, it is desirable to provide a network having a bandwidth greater than the fast ethernet speeds but appreciably less than the giga ethernet speeds.

Most high level applications designed to communicate over a network using an internet protocol write and receive data from one IP address. Further, clients and servers communicate by addressing data to a particular IP address. While providing multiple, addressable physical connections between clients and servers can increase network bandwidth, the high level applications would require modification to utilize the multiple addresses and physical connections. Thus, it is desirable to increase the network bandwidth so that high level applications already installed on clients and servers can communicate over multiple physical connections using one IP address rather than multiple IP addresses.

SUMMARY OF THE INVENTION

The present invention is directed to a network interface including a server communicating at a predetermined high bandwidth via a server physical network interface. The server supports a server high level application. A client communicates at a predetermined low bandwidth via a plurality of client physical network interfaces, where the low bandwidth is less than the high bandwidth. The client supports a client high level application. The client also includes a virtual network interface utilized by server and client applications communicating over the network. A switch communicates with the server at the high bandwidth and communicates with the client at the low bandwidth to enable and control communications between the server and the client.

This invention is also directed to a method for increasing bandwidth across multiple network interfaces including providing a high level application at each of a network client and a network server and providing a single physical connection between the server and the network. The method also includes providing a plurality of physical connections between the client and the network and providing a virtual interface between the plurality of physical connections and the client high level application. The method further includes communicating between the client and the server by utilizing the virtual interface.

For a more complete understanding of the invention, its objects and advantages, reference should be made to the following specification and to the accompanying drawings.

BRIEF DESCRIPTION OF THE DRAWINGS

The drawings, which form an integral part of the specification, are to be read in conjunction therewith, and like reference numerals are employed to designate identical components in the various views.

DESCRIPTION OF THE PREFERRED EMBODIMENT

Figure 1:
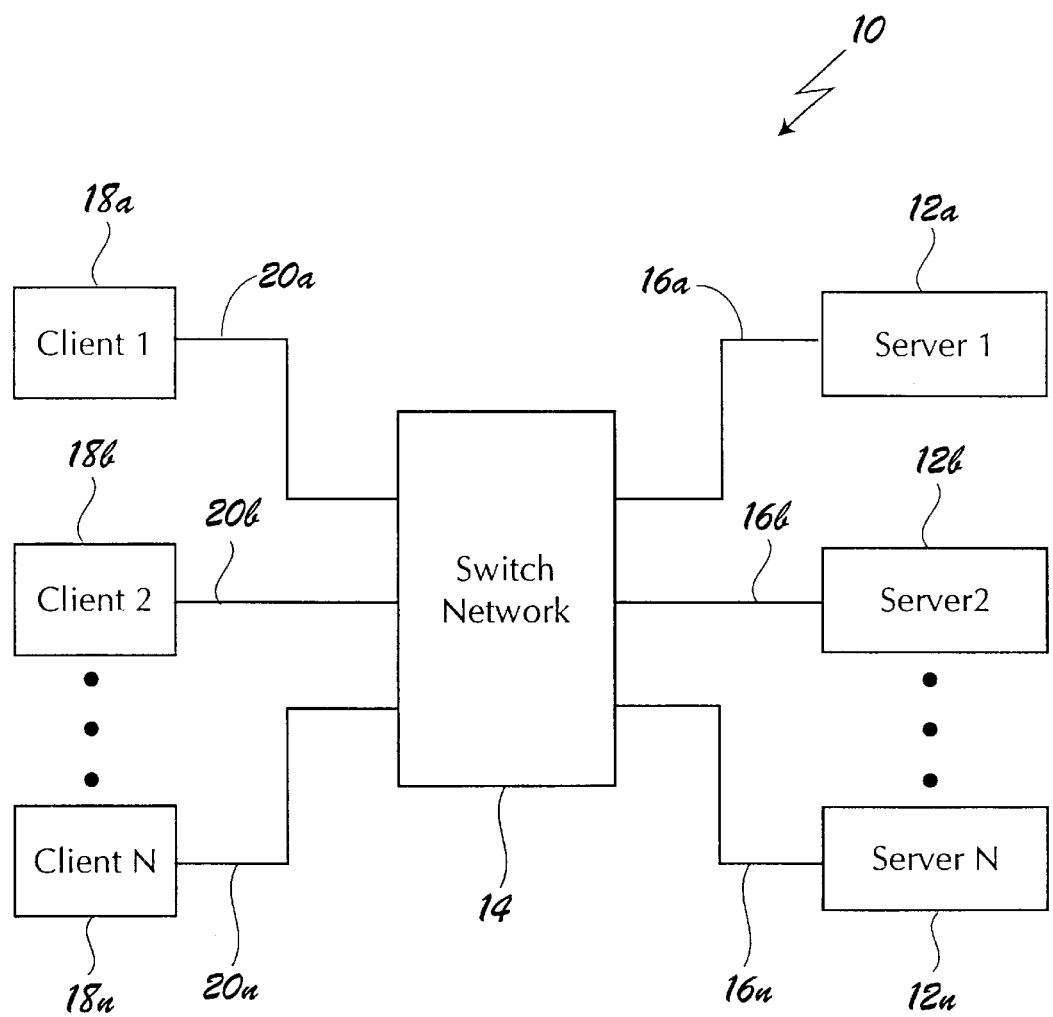
FIG. 1 is a block diagram of the apparatus for increasing network bandwidth arranged in accordance with the principles of the present invention.

FIG. 1 is a block diagram of a communications network 10 arranged in accordance with the principles of the present invention. Communications network 10 includes one or a plurality of servers 12a, 12b, . . . , 12n, collectively referred to as server 12. Each server 12a, 12b, . . . , 12n connects to a switch network 14 via a physical connection. Physical connections between server 12 and switch network 14 are embodied as a high bandwidth connection 16a, 16b, . . . , 16n and connect each of servers 12a, 12b, . . . , 12n to switch network 14.

Switch network 14 also connects to one or a plurality of clients 18a, 18b, . . . , 18n. Each client connects to switch network 14 via a physical connection 20a, 20b, . . . , 20n. Physical connections 20a, 20b, . . . , 20n are low bandwidth connections and will be referred to collectively as low bandwidth connection 20.

Preferably, communications network 10 is implemented utilizing an ethernet configuration. High bandwidth connection 16 preferably operates at giga ethernet speeds of approximately 1000 Mbps. Low bandwidth connection 20 preferably operates at a fast ethernet speed of approximately 100 Mbps. One skilled in the art will recognize that other physical implementations may define communications network 10.

Figure 2:
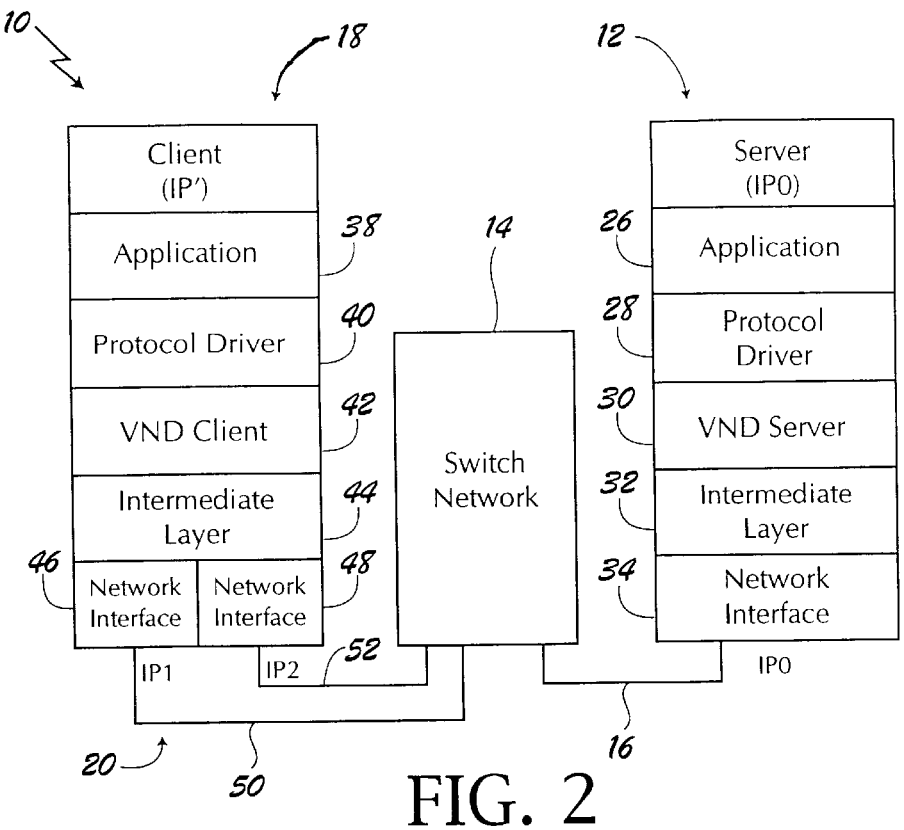
FIG. 2 is a block diagram showing components of a client and a server of the network of FIG. 1.

FIG. 2 depicts an expanded block diagram of an exemplary server 12, switch network 14, client 18, high bandwidth connection 16, and low bandwidth connection 20 of FIG. 1. Server 12 is configured to support operation of one or a plurality of high level applications 26, such as end user applications and the like. Application 26, as will be described in greater detail herein, is configured to communicate with other applications over communications network 10.

In order to enable network communications, server 12 includes a protocol driver 28, a virtual network driver (VND) server 30, and intermediate layer 32. Protocol driver 28 provides an interface between application 26 and VND server 30. Similarly, VND server 38 provides an interface between protocol driver 28 and intermediate layer 32. Finally, intermediate layer 32 provides an interface between VND server 30 and network interface 34. Network interface 34 may also be referred to as an ethernet card or other device which enables physical connection between server 12 and other components of communications network 10. Network interface 34 operates at a high bandwidth, such as 1000 Mbps, connects to high bandwidth connection 16 which in turn connects to switch network 14. High bandwidth connection 16 and associated network interface 34 is referenced within communications network 10 utilizing a physical address IP0. Address IP0 denies an address for server 12.

Similarly, client 18 includes one or a plurality of high level applications 38 which operate similarly to high level application 26 of server 12. A protocol driver 40 provides an interface between application 38 and a virtual network driver (VND) client 42. Similarly, VND client 42 enables communication between protocol driver 40 and intermediate layer 44. Intermediate layer 44 enables communication between virtual network driver 42 and one of two network interfaces 46, 48. Network interfaces 46, 48 connect to switch network 14 through a pair of respective physical connections 50, 52 which collectively define low bandwidth connection 20. Each physical connection 50, 52 and associated network interface 46, 48 is referenced within communications network 10 utilizing a respective physical address IP1, IP2. Network interfaces 46, 48 may also be referred to as an ethernet card or other device which enables physical connection between server 12 and other components of communications network 10. Network interfaces 46, 48 operate at a low bandwidth, such as 100 Mbps and connect to low bandwidth connection 20 which in turn connects to switch network 14.

Of particular interest to the present invention, client 18 communicates with server 12 through switch network 14 utilizing a pair of physical connections 50, 52 which collectively define low bandwidth connection 20. Because high bandwidth connection 16 operates at a significantly greater speed than low bandwidth connection 20, utilizing a pair of physical connections 50, 52 enables a significant bandwidth increase over the bandwidth provided by an individual physical connection 50 or 52. Network interfaces 46, 48 operate to enable communications between client 18 and switch network 14 utilizing the respective pair of physical connections 50, 52.

Application 26 of server 12 and application 38 of client 18 communicate with each other and with other applications by writing to a single internet protocol (IP) address. By utilizing a single IP address to communicate, applications 26, 38 need not be modified in order to take advantage of the multiple physical connections 50, 52 interconnecting client 18 with switch network 14. VND server 30 and VND client 42 to enable respective applications 26, 38 to write to a single IP address while address while utilizing multiple physical connections 50, 52 between client 18 and switch network 14.

As discussed above, server 12 is referenced utilizing a single IP address, defined as IP0. When application 38 of client 18 of communications network 10 attempts to communicate with application 26 of server 12, data is sent to IP0. Similarly, when application 26 of server 12 outputs data, the sending address is IP0.

Applications 26, 30 reference client 18 utilizing a virtual internet protocol (IP') address. That is, for purposes of communications involving client 18 over communications network 10, applications 26, 38, refer to address IP'. When application 26 desires to communication with application 38 of client 18, application 26 of server 12 addresses client 18 utilizing IP'. Similarly, when application 38 of client 18 desires to communicate with application 26 of server 12, application 38 addresses IP0 and provides a return address of IP'.

While applications 26, 38 communicate referencing virtual network address IP' when network communications involve client 18, each network interface 46, 48 is referenced using their physical internet protocol addresses IP1, IP2, respectively. Internet protocol addresses IP1, IP2 refer to the respective physical address of network interfaces 46, 48. Similarly, IP0 refers to a physical address for network interface 34. VND server 30 of server 12 and VND client 42 of client 18 enable applications 26, 38 to communicate using virtual address IP' so that physical addresses IP1 and IP2 appear transparent to applications 26, 38.

Figure 3:
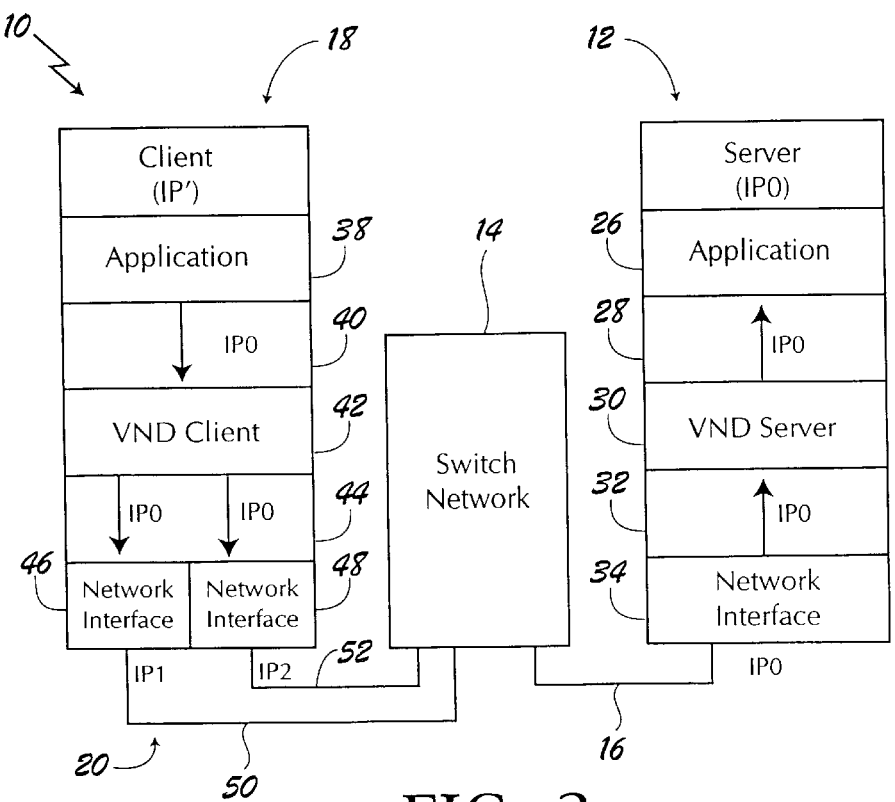
FIG. 3 is a block diagram showing the client sending a request to the server over the network.

FIG. 3 depicts operation of communications network 10 when application 38 of client 18 generates a request of or transfers data to server 12. The request or data transfer creates data traffic from client 18 to server 12. More particularly, to service the transmission specified by application 38, data traffic flows from VND client 42 to VND server 30. VND client 42 receives the request to send data to IP0 from application 38 through protocol driver 40. In this particular example, application 38 requests that data be sent to server 12 at address IP0.

VND client 42 sends data to physical address IP0 through physical addresses IP1 or IP2. VND client 42 distributes data between physical addresses IP1 and IP2 to balance the data sent through each address. This data is sent through each network interface 46, 48, which corresponds to respective physical address IP1, IP2, through intermediate layer 44. The data output through network interfaces 46, 48 travels through switch network 14 and to network interface 34 at address IP0 of server 12. The data flows through intermediate layer 32 and to VND server 30. VND server 30 assembles data received over network interface 34 at address IP0. VND server 30 reassembles data distributed to each network interface 46, 48 by VND client 42 into the data initially sent by application 38. VND server 30 outputs the data through protocol driver 28 to application 26. Thus, application 26 and application 38 appear to have communicated between virtual network address IP' and physical network address IP0 while utilizing network interfaces 46, 48 having respective addresses IP1, IP2.

Figure 4:
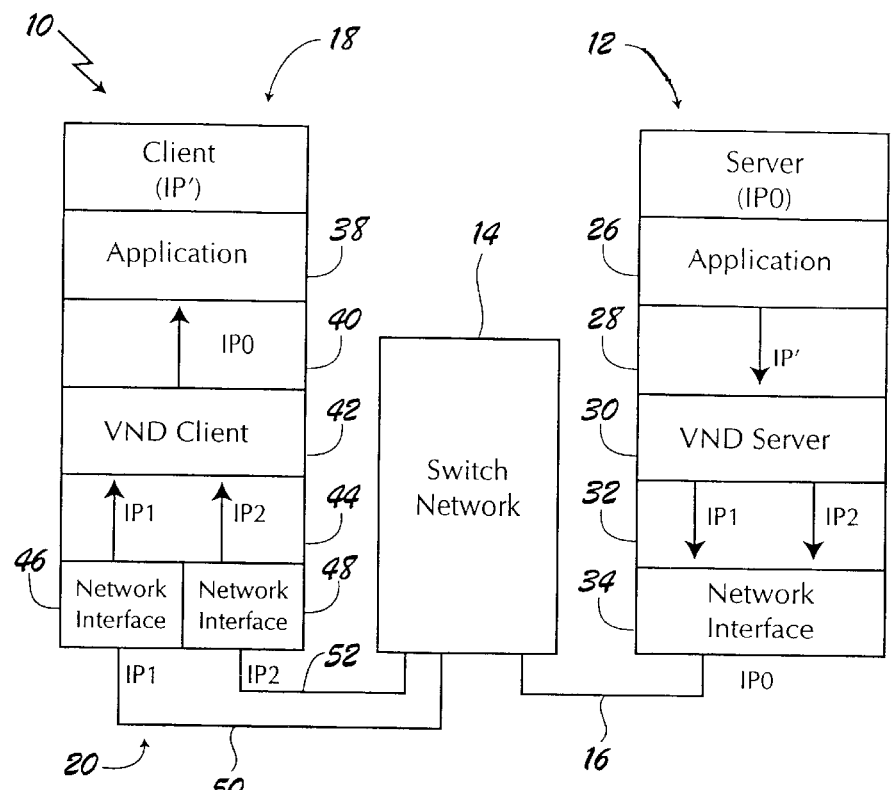
FIG. 4 is a block diagram showing the server responding to the request from the client.

FIG. 4 depicts data flow when sending data from application 26 of server 12 to application 38 of client 18 utilizing a virtual connection between physical address IP0 and virtual address IP'. Data from application 26 utilizes a connection between physical address IP0 to virtual address IP'. When VND server 30 receives data from application 26 through protocol driver 28, VND server 30 transmits this data through two paths, mainly through physical address IP1 and physical address IP2. These addresses are encoded in the virtual address IP'. Data is input to client 18 via network interfaces 46, 48. VND client 42 receives the data and assembles the data received at physical address IP1 and IP2 into a coherent stream of data sent to application 38 through protocol driver 40 using virtual address IP'.

Figure 5:
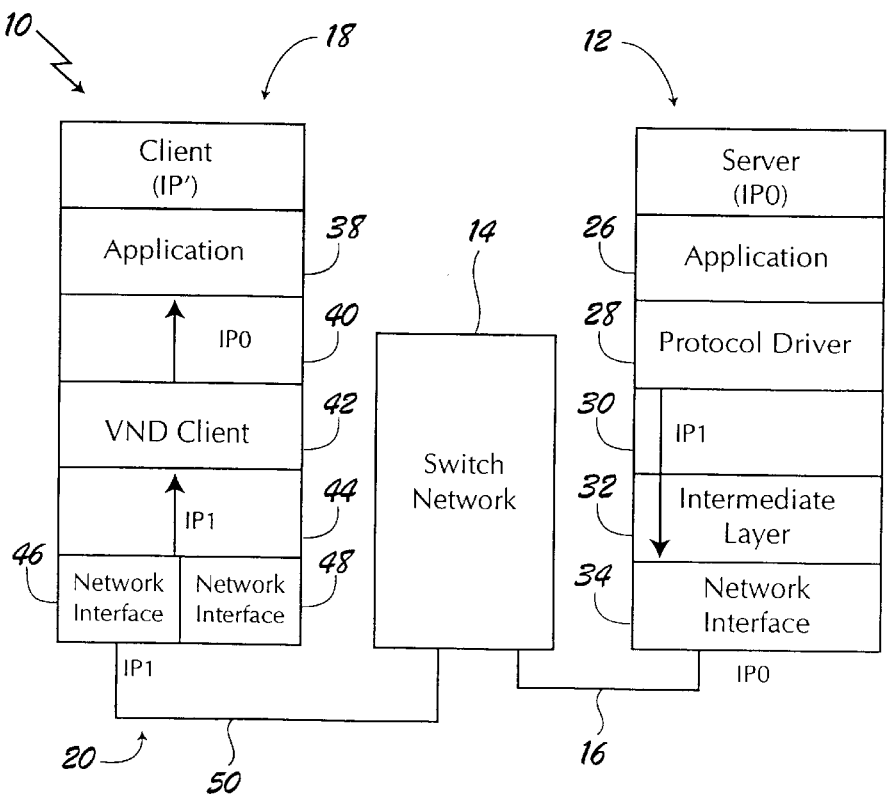
FIG. 5 is a block diagram of a client and server on a network in which the server is not configured to write to a virtual network interface.

FIG. 5 depicts an alternate configuration for server 12 configured without a VND server 30 as described above. Server 12 includes an application 26, protocol driver 28, intermediate layer 32, and network interface 34, all of which operate as described above. Server 12 of FIG. 5 omits VND server 30. Accordingly, server 12 and client 18 exchange data utilizing only one network interface 46, 48 their corresponding physical address IP1, IP2. In this configuration, communications over communications network 10 occurs utilizing a standard internet protocol configuration which is known in the art. Applications 26, 38 refer to one of network interface 46, 48 and their corresponding physical address IP1, IP2 when communicating with client 18. VND client 42 of client 18 simply exchanges data with application 38 without having to distribute or assemble data as if sent or received utilizing multiple network interfaces.

As shown at FIG. 5, network interface 46 and physical address IP1 are selected for communication between server 12 and client 18. Accordingly, when applications operating on a VND server or client communicate with applications operating on a non-VND server or client, the VND of the VND server or client will simply pass data to and from the application. The application on the VND server or client and the application on the non-VND server or client communicate using a traditional internet protocol.

Figures 6, 7:
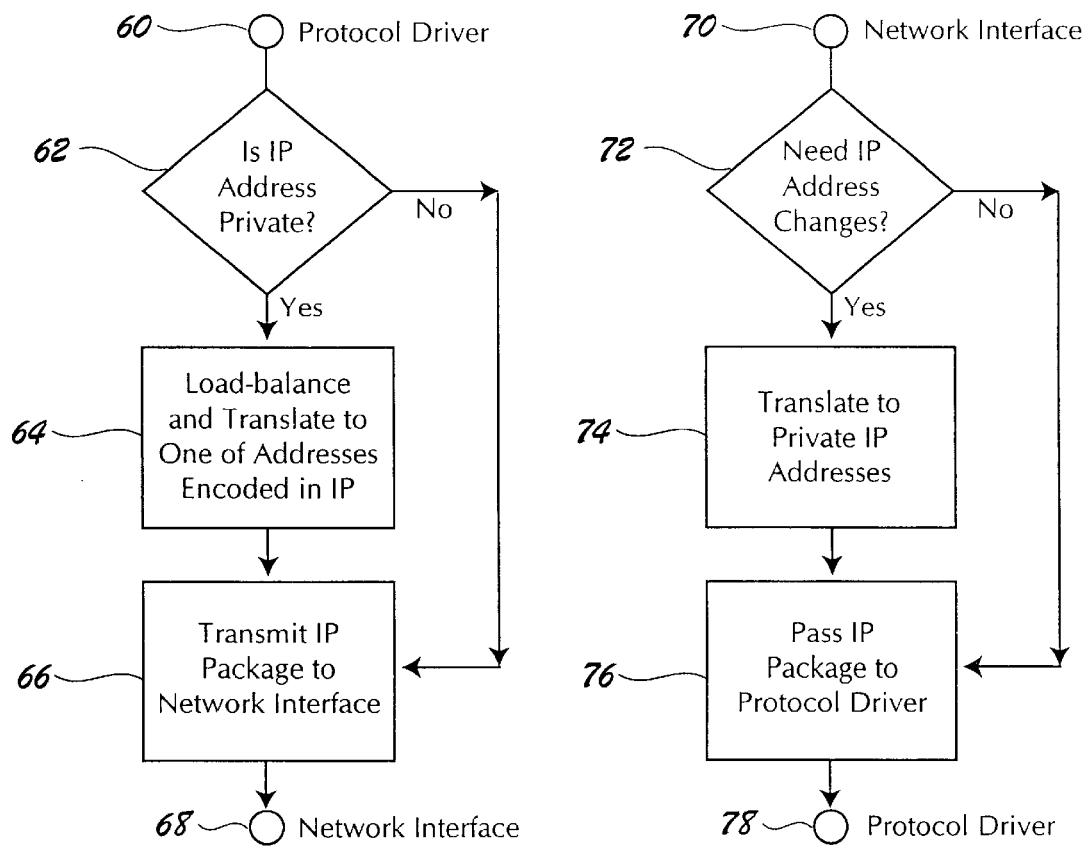
FIG. 6 is a flow diagram showing transmission of a message to a virtual internet protocol address.
FIG. 7 is a flow diagram showing receipt of a message to a virtual internet protocol address.

FIG. 6 depicts a flow diagram for a data transmit operation from a protocol driver to a network interface between a VND configured client and VND configured server. Control begins at protocol driver 60. Control proceeds to decision block 62. At decision block 62, a determination is made whether the IP address is a virtual address. If the destination is a virtual address, control proceeds to process block 64. At process block 64, a load balancing operation occurs to balance and distribute data sent to the virtual IP address between the plurality of available physical addresses associated with a virtual IP address. Control next proceeds to process block 66 in which the transmitting server or client transmits the IP package to the network interface as shown at block 68. The network interface then transmits the internet protocol package to a destination client or server directly or through a switch network.

FIG. 7 depicts a flow chart for a transmit operation between a network interface and a protocol driver. Control begins at network interface 70 which represents a network interface such as any of network interfaces 34, 46, 48. Control proceeds to decision block 72. Decision block 72 determines if the IP address must be translated from a plurality of physical IP addresses to a virtual IP address. If so, control proceeds to process block 74 which translates the plurality of physical IP addresses to a virtual IP address and assembles the data sent to the virtual IP address in proper order. Control next proceeds to process block 76 which passes the virtual IP address data package to a protocol driver 78, such as protocol drivers 28, 40 of FIGS. 1–5. Protocol driver 78 then passes the virtual IP addressed data to the respective application such as applications 26, 38, of FIGS. 1–5.

One benefit of the present invention is an increased bandwidth of a typically slower client 18. In particular, in a system having N×100 Mbps responding devices and receiving requests from a N×100 Mbps, both with a VND capabilities, the normally lower bandwidth limitation of 100 Mbps can be increased by a factor of N. More importantly, the above-described apparatus and method for increasing network bandwidth across multiple network interfaces enables applications to refer to virtual IP addresses rather than physical IP address while obtaining an increased speed. This provides the added benefit that high level applications, which are often typically purchased, and not within the users control, need not be modified to operate at the increased speed.

While the invention has been described in its presently preferred form, it is to be understood that there are numerous applications and implementations for the present invention. Accordingly, the invention is capable of modification and changes without departing from the spirit of the invention as set forth in the appended claims.

What is claimed is:

1. A network interface comprising:
   a server, the server communicating at a predetermined high bandwidth via a server physical network interface, the server supporting a server high level application;
   a client, the client communicating at a predetermined low bandwidth via a plurality of client physical network interfaces, the low bandwidth being less than the high bandwidth, the client supporting a client high level application, the client including a client virtual network interface for transparently providing the client high level application with a virtual interface to said plurality of client physical interfaces, said virtual network interface being located between the high level application and said plurality of client physical interfaces in the operating hierarchy of client components, the virtual network interface being utilized by server and client applications communicating over the network, said virtual network interface providing IP packet transfer between said client high level application and said plurality of client physical interfaces;
   a virtual network driver (VND) client, the VND client providing an interface between the client virtual network interface and the client physical network interfaces, wherein the VND client distributes IP packet data communicated through the virtual network interface by the client application between the client physical network interfaces and assembles IP packet data communicated through the client physical network interfaces for the client application for the virtual network interface; and
   a switch, the switch communicating with the server at the high bandwidth and communicating with the client at the low bandwidth, the switch enabling and controlling communications between the server and the client.

2. The apparatus of claim 1 further comprising:
   a server IP (Internet Protocol) address associated with the server physical interface;
   a plurality of physical client IP addresses associated with each of the respective client physical interfaces; and
   a virtual client IP address associated with the client virtual network interface,
   wherein applications communicate over the network utilizing the virtual client IP address rather than the physical client IP addresses.

3. The apparatus of claim 1 further comprising a virtual network driver (VND) server, the VND server providing an interface between the server application and the server physical network interface, wherein the VND server distributes IP packet data communicated by the server application over the server physical network interface between the client physical network interfaces and assembles IP packet data communicated from the client physical network interfaces for the server application.

4. The apparatus of claim 1 wherein the virtual network driver (VND) client providing an interface between the client virtual network interface and the client physical network interfaces, wherein the VND client distributes IP packet data communicated through the virtual network interface by the client application between the client physical network interfaces and assembles IP packet data communicated through the client physical network interfaces for the client application for the virtual network interface.

5. The apparatus of claim 4 further comprising a virtual network driver (VND) server, the VND server providing an interface between the server application and the server physical network interface, wherein the VND server distributes IP packet data communicated by the server application over the server physical network interface between the client physical network interfaces and assembles IP packet data communicated from the client physical network interfaces for the server application.

6. A method for increasing bandwidth across multiple network interfaces comprising the steps of:
   providing a high level application at each of a network client and a network server;
   providing a single physical connection between the server and the network;
   providing a plurality of physical connections between the client and the network;
   providing transparently, a virtual interface between the plurality of physical connections and the client high level application;
   locating said virtual interface between the high level application and said physical connections in the operating hierarchy of client components; and
   communicating between the client and the server by utilizing the virtual interface by providing IP packet transfer between said client high level application and said plurality of client physical interfaces;
   addressing the virtual interface when sending data to the client application;
   referring to the virtual interface as the initiating address when the client application sends data;
   distributing IP packet data communicated from a client application to a server application through the plurality of client physical interfaces; and
   distributing IP packet data communicated from a server application to a client application through the plurality of client physical interfaces.

7. The method of claim 6 further comprising the steps of:
   assembling IP packet data addressed to the client application and received from each of the client physical interfaces; and
   assembling IP packet data addressed to the sever application and received from each of the client physical interfaces.

8. The method of claim 6 further comprising:
   balancing data communication load across the client physical network interfaces by apportioning the IP Packet data communicated from a client application to a server application across the plurality of client physical interfaces.

9. The network interface of claim 1 wherein the VND client distributes IP packet data communicated through the virtual network interface by the client application between at least two of the client physical network interfaces to balance the data communication load across the bandwidth capacity of the client physical network interfaces.

10. The network interface of claim 3 wherein the VND server distributes IP packet data communicated by the server application over at least two of the server physical network interfaces to balance the data communication load across the bandwidth capacity of the server physical network interfaces.

* * * * *